(12) United States Patent
Nagaoka et al.

(10) Patent No.: US 6,302,591 B1
(45) Date of Patent: Oct. 16, 2001

(54) OPTICAL FIBER CONNECTOR

(75) Inventors: Yasutaka Nagaoka; Nobuhiko Suzuki; Hiroyuki Kondo; Norihito Suzuki; Toru Ikumi; Tsuguhito Shirakawa, all of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/342,269

(22) Filed: Jun. 29, 1999

(30) Foreign Application Priority Data

Jun. 29, 1998 (JP) .................................................. 10-182213
Dec. 9, 1998 (JP) .................................................. 10-349630

(51) Int. Cl.$^7$ .................................................. G02B 6/38
(52) U.S. Cl. .............................. 385/59; 385/60; 385/76; 385/77; 385/78; 385/89; 385/92
(58) Field of Search .................................. 385/55, 56, 58, 385/59, 60, 71, 72, 76, 77, 78, 89, 92, 139

(56) References Cited

U.S. PATENT DOCUMENTS

| 4,281,892 |   | 8/1981  | Sitabkhan    | 385/59 X  |
|-----------|---|---------|--------------|-----------|
| 4,483,584 |   | 11/1984 | Gresty       | 385/59 X  |
| 4,762,389 | * | 8/1988  | Kaihara      | 350/96.21 |
| 4,798,440 |   | 1/1989  | Hoffer et al.| 385/59 X  |
| 5,091,991 | * | 2/1992  | Briggs et al.| 385/82    |
| 5,452,388 | * | 9/1995  | Rittle et al.| 385/92    |
| 6,095,695 | * | 8/2000  | Ohtsuka et al.| 385/72   |
| 6,113,280 | * | 9/2000  | Nagaoka et al.| 385/53   |

FOREIGN PATENT DOCUMENTS

| 0 290 964 A2 | 11/1988 | (EP) | G02B/6/38 |
| 0 339 876 A1 | 11/1989 | (EP) | G02B/6/38 |
| 59-139012    | 8/1984  | (JP) | G02B/7/26 |
| 59-140411    | 8/1984  | (JP) | G02B/7/26 |
| 1-316711     | 12/1989 | (JP) | G02B/6/36 |
| 2-226207     | 9/1990  | (JP) | G02B/6/36 |

OTHER PUBLICATIONS

Japanese Abstract 07218776, dated Aug. 18,1995.

* cited by examiner

*Primary Examiner*—Brian Healy
(74) *Attorney, Agent, or Firm*—Sughrue, Mion, Zinn, Macpeak & Seas, PLLC

(57) ABSTRACT

In an optical fiber connector 1, optical fibers 2 are inserted respectively into ferrules 3 to form optical fiber plugs 4, and distal end portions of the optical fiber plugs 4 are inserted into a connector housing 6, and a holder 7 is fitted on the connector housing from rear end portions of the optical fiber plugs. The optical fiber connector 1 is fitted into a light receiving-emitting device 8, so that distal end surfaces of the optical fiber plugs are kept spaced a predetermined distance respectively from light receiving-emitting elements received within the light receiving-emitting device. The holder includes insertion holes 41 for respectively passing the optical fibers therethrough in a direction of insertion of the optical fiber plugs, and introduction notches 45 communicating respectively with the insertion holes in a direction intersecting the inserting direction. A ferrule-pressing member 5 is mounted on the optical fiber plugs so as to spring-bias the optical fiber plugs, fitted respectively into the insertion holes through the respective introduction notches after the distal end surfaces of the optical fibers are polished, toward the connector housing.

5 Claims, 14 Drawing Sheets

OPTICAL FIBER CONNECTOR

BACKGROUND OF INVENTION

1. Field of Invention

This invention relates to an optical fiber connector.

2. Related art

A conventional optical fiber connector, as shown in FIG. 18, is disclosed (for example, see Unexamined Japanese Patent Publication Sho. 63-128511).

In this optical fiber connector 70, end portions of optical fibers 71 are passed respectively through insertion holes 72a in a holder 72 and also through coil springs 73, and the optical fibers 71 are bonded to inner surfaces of ferrules 74, respectively, thereby forming optical fiber plugs 75, and the optical fiber plugs 75 are inserted into a connector housing 76', and then the holder 72 is fitted on the connector housing 76'.

Distal end surfaces 75a of the optical fiber plugs 75 are polished, and then the optical fiber connector 70 is fitted into a light receiving-emitting device 76, so that the distal end surfaces 75a of the optical fiber plugs 75 are spring-biased (urged) into receiving tubes 77, respectively. As a result, the distal end surfaces 75a of the optical fiber plugs 75 are always kept spaced a predetermined distance respectively from light receiving-emitting elements (not shown) received respectively in the light receiving-emitting device 76.

However, for example, when a ring-like optical LAN (Local Area Network) 78 is to be built by optical fiber connectors 70A to 70D as shown in FIG. 19, the holder 72, the coil spring 73 and the ferrule 74 are mounted on an end portion of each of optical fibers 71a to 71d, thereby forming optical fiber plugs 75A to 75D, and then the distal end surfaces of the optical fiber plugs 75A to 75D must be polished. Therefore, there has been encountered a drawback that the polishing operation is troublesome, and can not be automated.

Therefore, in order to facilitate the polishing operation, an optical connector as shown in FIG. 20 has been proposed (Unexamined Japanese Patent Publication Nos. 59-139012, 59-140411 and 1-316711).

In this optical connector 80, optical fibers 82, passed respectively through coil springs 81, are inserted respectively into ferrules 83, thereby forming two optical fiber plugs 84, and the ferrules 83 of the optical fiber plugs 84 are inserted respectively into ferrule receiving chambers 86 in a connector housing 85, and a holder 87 is mounted on the connector housing 85. In this condition, one end 81a of each coil spring 81 acts on a flange 83a of the associated ferrule 83 to urge the same toward the connector housing 85.

However, the two optical fibers 82 are passed through the coil springs 81, respectively, and therefore there has been encountered a drawback that the number of the component parts is increased. And besides, there has been a possibility that during the operation, the coil spring 81 is inadvertently pushed deep into the ferrule receiving chamber 86 to be disposed near to a core 82a. And, if the coil spring is thus pushed deep into the ferrule receiving chamber, there has been encountered a drawback that an error in the confirmation of the presence of the coil spring 81 in the ferrule receiving chamber 86 is liable to occur.

And besides, before the holder 87 is mounted on the connector housing 85, the coil springs 81 are displaced out of position because of their own weight, and therefore the efficiency of mounting of the holder 87 was poor. The assembling operation is carried out while keeping the two optical fibers 82 parallel to each other, and therefore the coil springs 81 often became entangled with each other.

SUMMARY OF INVENTION

It is an object of this invention to provide an optical fiber connector in which the number of component parts is reduced, and a coil spring-mounting operation is easy, and the efficiency of mounting of a holder on a connector housing is enhanced, and an assembling error is prevented, and an automation can be adopted.

The above object has been achieved by an optical fiber connector of the present invention wherein end portions of optical fibers are inserted respectively into ferrules to form optical fiber plugs, and the optical fiber plugs are inserted into a connector housing, with the ferrules first introduced thereinto, and a holder is fitted on the connector housing from rear end portions of the optical fiber plugs, and the optical fiber connector is fitted into a light receiving-emitting device, so that distal end surfaces of the optical fiber plugs are kept spaced a predetermined distance respectively from light receiving-emitting elements received within the light receiving-emitting device; CHARACTERIZED in that the holder includes insertion holes for respectively passing the optical fibers therethrough in a direction of insertion of the optical fiber plugs, and introduction notches communicating respectively with the insertion holes in a direction intersecting the inserting direction; and a ferrule-pressing member is mounted on the optical fiber plugs so as to spring-bias the optical fiber plugs, fitted respectively into the insertion holes through the respective introduction notches after the distal end surfaces of the optical fibers are polished, toward the connector housing.

The ferrule-pressing member includes a rectangular pressing plate, a coil spring fixedly secured at one end thereof to the pressing plate, and retaining notches formed in the pressing plate, and the ferrule-pressing member is mounted on the ferrules through the retaining notches.

The coil spring is disposed parallel to a direction of axes of the optical fiber plugs, and front flanges, formed in a bulging manner respectively on outer peripheral surfaces of the ferrules, are abutted respectively against peripheral edges of the retaining notches, and a spring retaining portion for retaining the other end of the coil spring is formed on the holder, and all of the optical fiber plugs are simultaneously spring-biased toward the connector housing.

The ferrule-pressing member comprises a leaf spring member supported within the holder, and the leaf spring member has engagement notches for respectively passing the optical fibers therethrough, and each of the ferrules has a front flange for engagement with a portion within the connector housing, and a rear flange for engagement with a peripheral edge of the associated engagement notch, and the optical fiber plugs are passed respectively through the insertion holes, and are received respectively in the engagement notches.

The leaf spring is formed into a wavy cross-section, and has concave portions and a convex portion, and the engagement notches are formed respectively in the concave portions, so that the concave portions abut against the rear flanges, respectively, and the convex portion is held against an inner surface of the holder, so that the leaf spring spring-biases the optical fiber plugs toward the light receiving-emitting device.

DETAILED DESCRIPTION OF PREFERRED EMBODIMENTS

Figure 1:
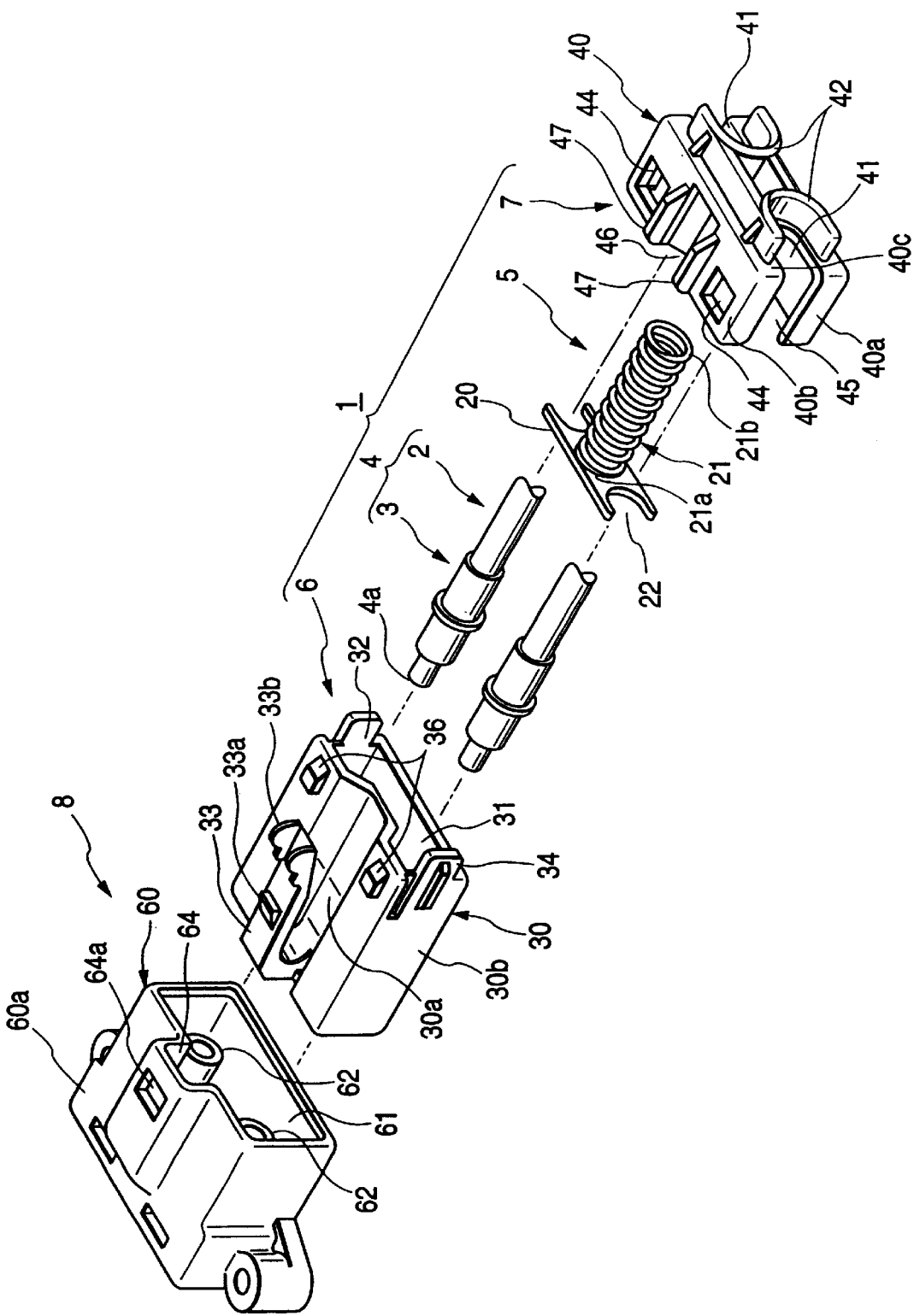
FIG. 1 is an exploded, perspective view of a first embodiment of an optical fiber connector of the present invention.

A preferred embodiment of the present invention will now be described with reference to the drawings.

First Embodiment

FIGS. 1 to 13 show a first embodiment of an optical fiber connector of the invention. Those constituent members identical to those of the conventional construction will be designated by identical reference numerals, respectively, and detailed explanation thereof will be omitted. In this embodiment, although two optical fiber plugs are used, an almost similar construction is provided in the case where more than two optical fiber plugs are used.

As shown in FIG. 1, this optical fiber connector 1 comprises ferrules 3 for respectively receiving optical fibers 2, a ferrule-pressing member 5 to be mounted on optical fiber plugs 4, a connector housing 6 for receiving the optical fiber plugs 4, and a holder 7 to be mounted on the connector housing 6. The optical fiber connector 1 is adapted to be fitted into a light receiving-emitting device 8 having light receiving-emitting elements 63 (see FIG. 10).

Figure 2:
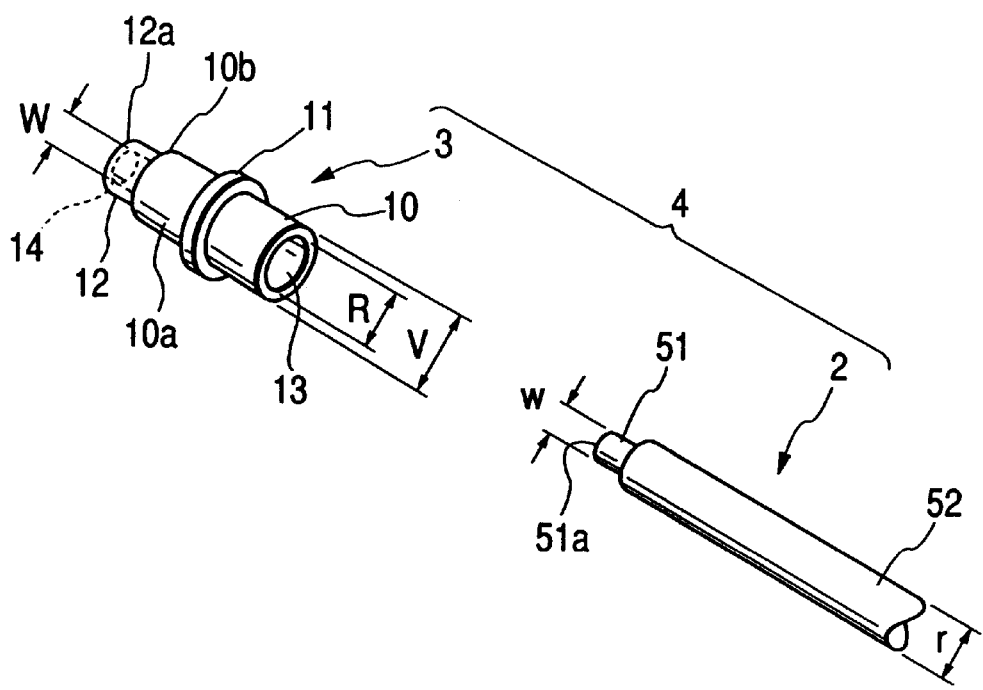
FIG. 2 is an exploded, perspective view of an optical fiber plug in FIG. 1.

As shown in FIG. 2, the ferrule 3 includes a cylindrical body 10, having a front peripheral flange 11 formed on an outer peripheral surface 10a thereof at a central portion thereof, and a smaller tube 12 extending from one end 10b of the cylindrical body 10. An inner diameter R of the cylindrical body 10 is substantially equal to an outer diameter r of the optical fiber 2 (R≈r). An inner diameter W of the smaller tube 12 is substantially equal to an outer diameter w of a clad 51 of the optical fiber 2 (W≈w).

An end portion of the optical fiber 2 is inserted into a fiber insertion hole (bore) 13 in the cylindrical body 10, and the clad 51 of the optical fiber 2 is inserted into a clad insertion hole (bore) 14 in the smaller tube 12. By polishing the clad 51 and the smaller tube 12, an end surface 12a of the smaller tube 12 is made flush with an end surface 51a of the clad 51. An outer surface of a jacket 52 is adhesively bonded and fixed to an inner surface of the fiber insertion hole 13.

Figure 3:
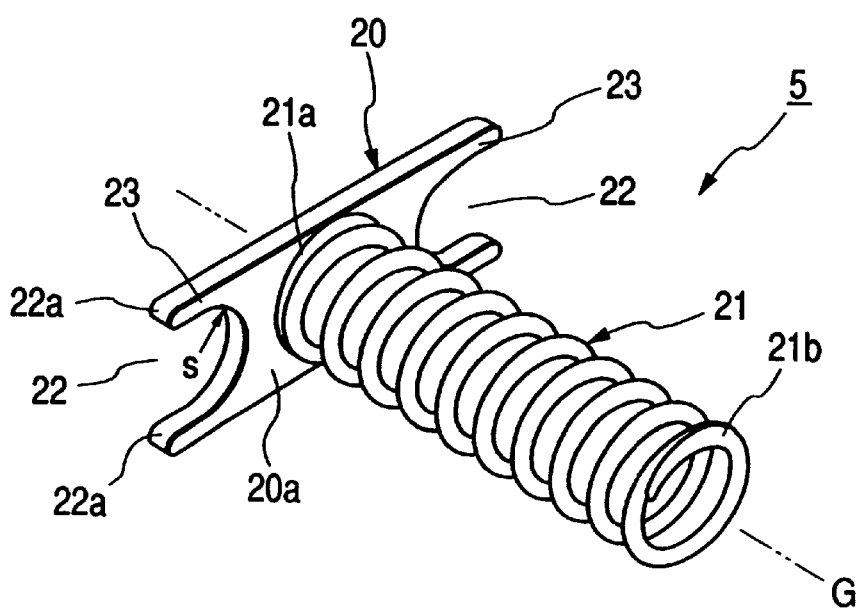
FIG. 3 is a perspective view of a ferrule-pressing member in FIG. 1.
Figure 4:
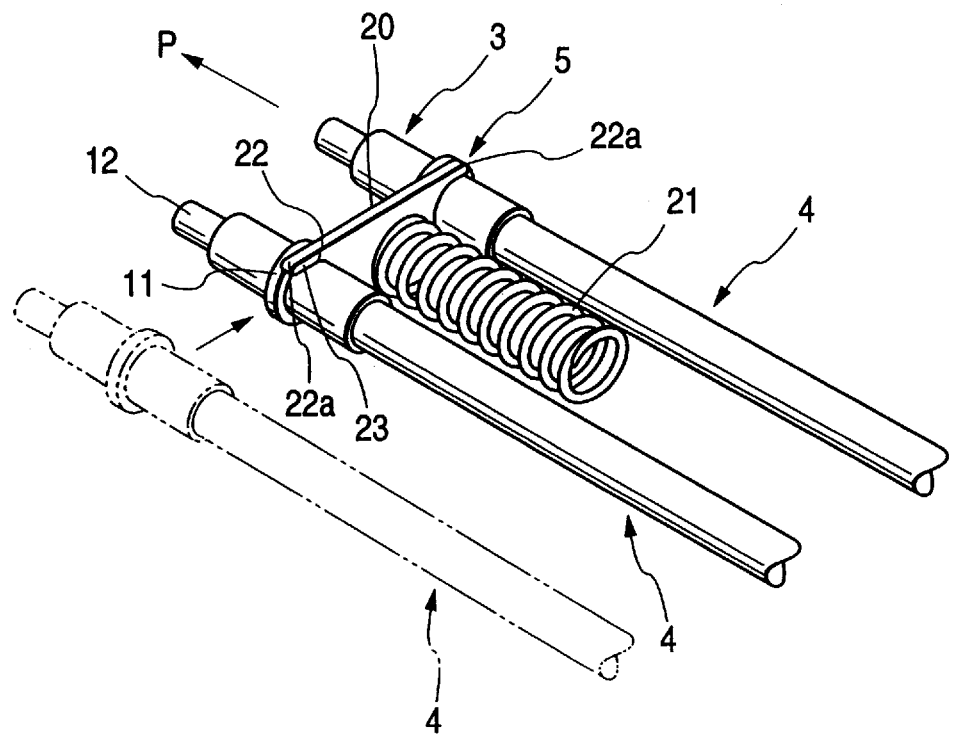
FIG. 4 is a perspective view showing a condition in which the ferrule-pressing member is mounted on the optical fiber plugs.
Figure 20:
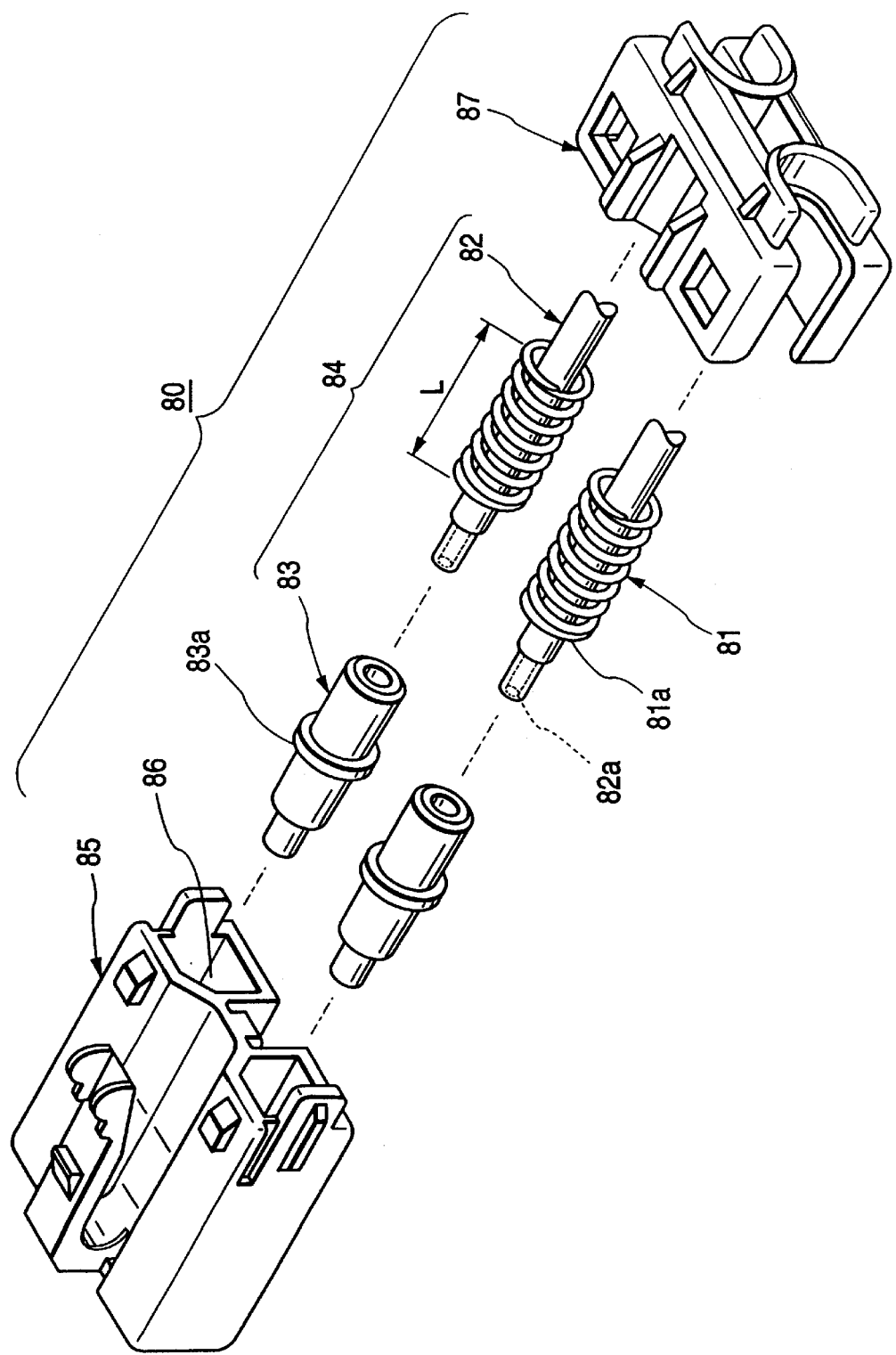
FIG. 20 is an exploded, perspective view of another conventional construction.

As shown in FIGS. 3 and 4, the ferrule-pressing member 5 to be mounted on the optical fiber plugs 4 includes a flat pressing plate 20, a coil spring 21 fixedly secured to a central portion of the pressing plate 20, and retaining notches 22 formed respectively in opposite ends of the pressing plate 20. A surface 20a of the pressing plate 20, to which one end of the coil spring 21 is fixedly secured, is disposed perpendicular to an axis G of the coil spring 21. Therefore, the ferrule-pressing member 5 has a T-shape. Each of the retaining notches 22 has a U-shape, and a diameter S of an arcuate portion of this notch is slightly larger than the outer diameter V (see FIG. 2) of the cylindrical body 10 (S>V). A length of the coil spring 21 is generally equal to a length L of the conventional coil spring 81 (see FIG. 20), and an elastic constant of the coil spring 21 is almost equal to that of this conventional coil spring. Slanting surfaces 22a are formed at a free end of the retaining notch 22 so that the ferrule 3 can be easily fitted into the retaining notch 22.

For mounting the ferrule-pressing member 5 on the two optical fiber plugs 4 as shown in FIG. 4, the optical fiber plug 4 is inserted or fitted laterally (as indicated by an arrow) into the retaining notch 22 in the pressing plate 20. In this condition, the coil spring 21 is disposed between the optical fiber plugs 4 in parallel relation to the direction of the axis (P) of each of the optical fiber plugs 4. Therefore, the number of the coil spring 21 to be used is one as compared with the conventional construction. Namely, the number of the component parts can be reduced.

As shown in FIG. 1, the connector housing 6 includes a housing body 30, a ferrule receiving chamber 32 extending through the housing body 30, a lock arm 33 formed in a projected manner on an upper wall 30a of the housing body 30, and guides 34 formed respectively on opposite side walls 30b and 30b of the housing body so as to hold the optical fibers 2. The holder 7 is mounted relative to an opening 31 of the ferrule receiving chamber 32. A lock projection 33a for engagement with the light receiving-emitting device 8 is formed on the lock arm 33, and an operating portion 33b is formed on a free end of this lock arm. The guides 34 extend respectively from the opposite side walls 30b and 30b toward the holder 7. A pair of lock projections 36 and 36 are formed on the upper surface of the housing body 30.

Figure 6:
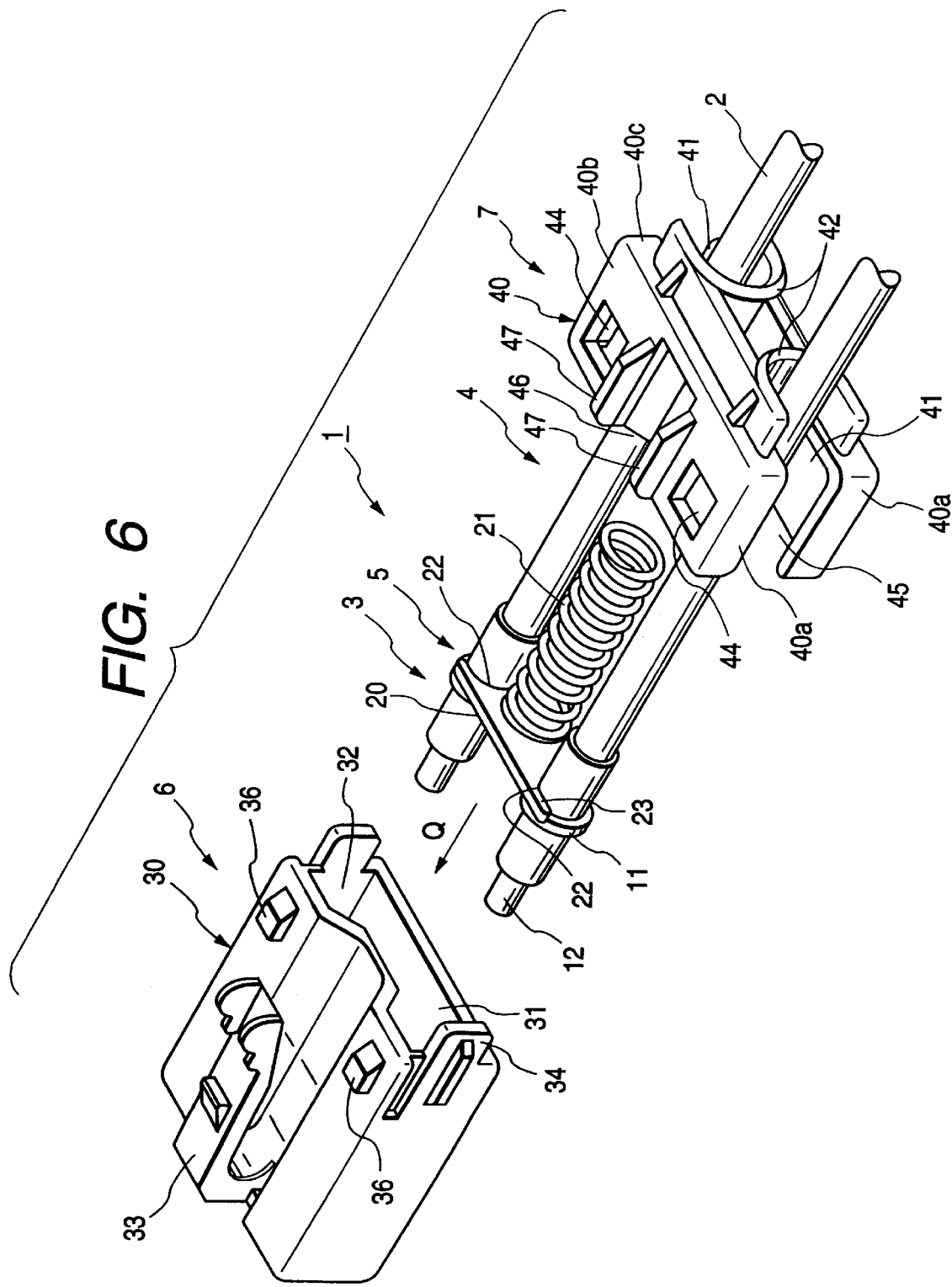
FIG. 6 is perspective view showing a condition before the optical fiber plugs are fitted in a connector housing and a holder.
Figure 8:
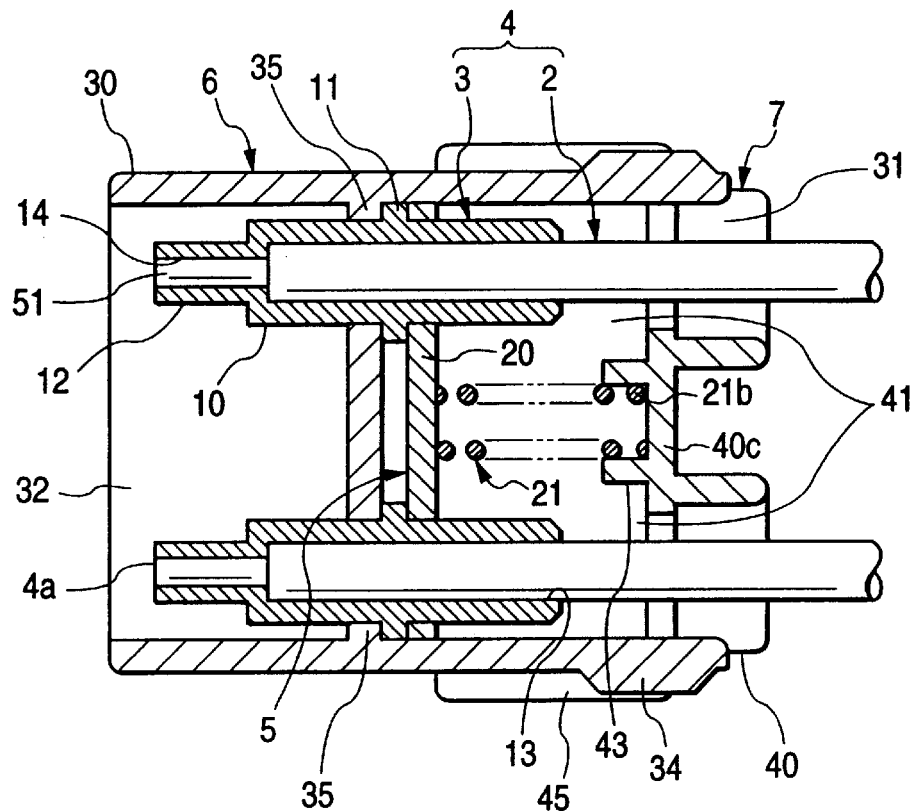
FIG. 8 is a cross-sectional view taken along the line X—X of FIG. 7.
Figure 9:
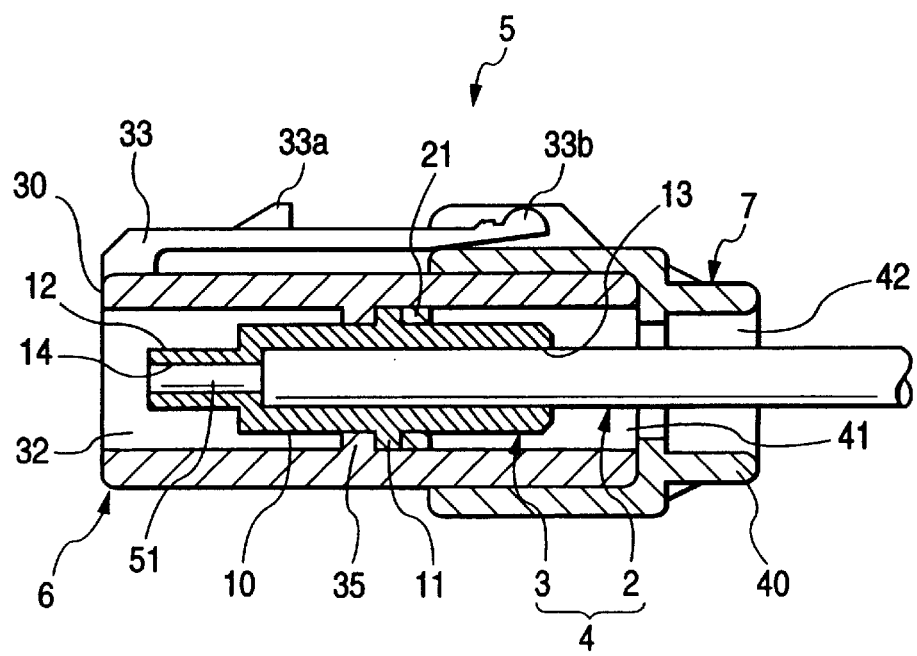
FIG. 9 is a cross-sectional view taken along the line Y—Y of FIG. 7.

As shown in FIGS. 6, 8 and 9, the holder 7 includes a box-shaped holder body 40, insertion holes 41 extending through the holder body 40 from its front side to its rear side, introduction notches 45, which are formed respectively in opposite side walls 40a and 40a of the holder body 40, and communicate respectively with the insertion holes 41, and a spring retaining portion 43 (see FIG. 8) for the ferrule-pressing member 5. The insertion holes 41 are disposed parallel to a direction (direction Q) of insertion of the optical fiber plugs 4 into the connector housing 6. The introduction notches 45 are disposed in a direction intersecting the inserting direction Q (that is, substantially perpendicular to the inserting direction Q). Lock holes 44 for respectively receiving the lock projections 36 on the connector housing 6 are formed on an upper wall 40b of the holder body 40.

A relief groove 46 (which is in the form of a recess) for receiving the lock arm 33 of the connector housing 6 is formed between the pair of lock holes 44. Positioning ribs 47 are provided at opposite sides of the relief groove 46, respectively. Curved walls 42 of a recumbent U-shape are formed on an outer surface of a rear wall 40c of the holder body 40, and extend along the peripheries of the insertion holes 41, respectively. The spring retaining portion 43 is formed at the inner surface of the rear wall 40c, and is in the form of a projection or a recess. The other end portion 21b of the coil spring 21 of the ferrule-pressing member is engaged with the spring retaining portion 43.

Figure 5:
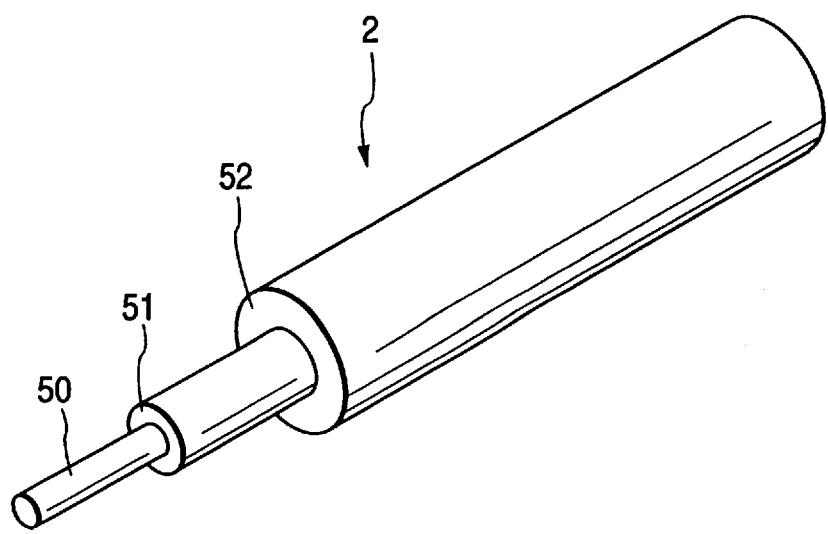
FIG. 5 is a perspective view of an optical fiber in FIG.

As shown in FIG. 5, the optical fiber 2 comprises a core 50 for propagating an optical signal, the clad 51 formed on an outer peripheral surface of the core 50, and the jacket 52 formed on an outer peripheral surface of the clad 51.

Figure 10:
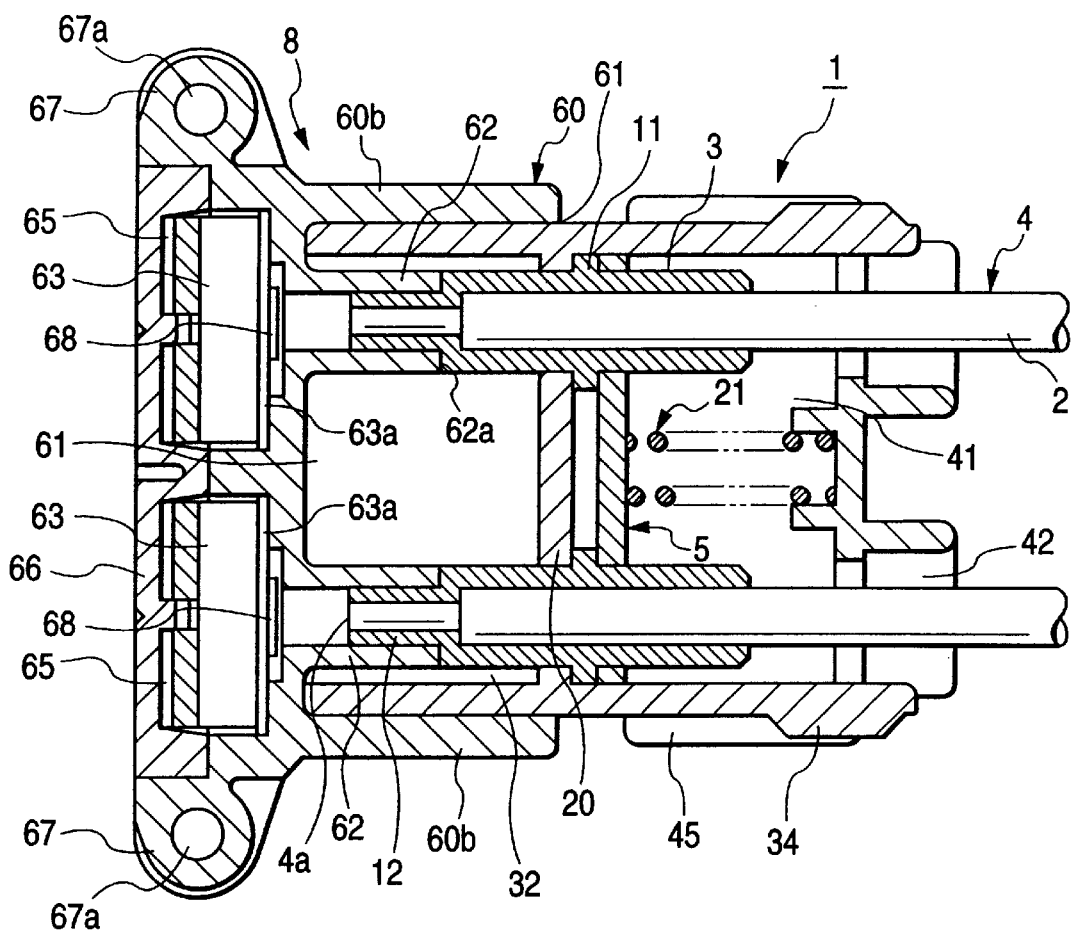
FIG. 10 is a cross-sectional view showing a condition in which a light receiving-emitting device is mounted on the connector of FIG. 8.
Figure 11:
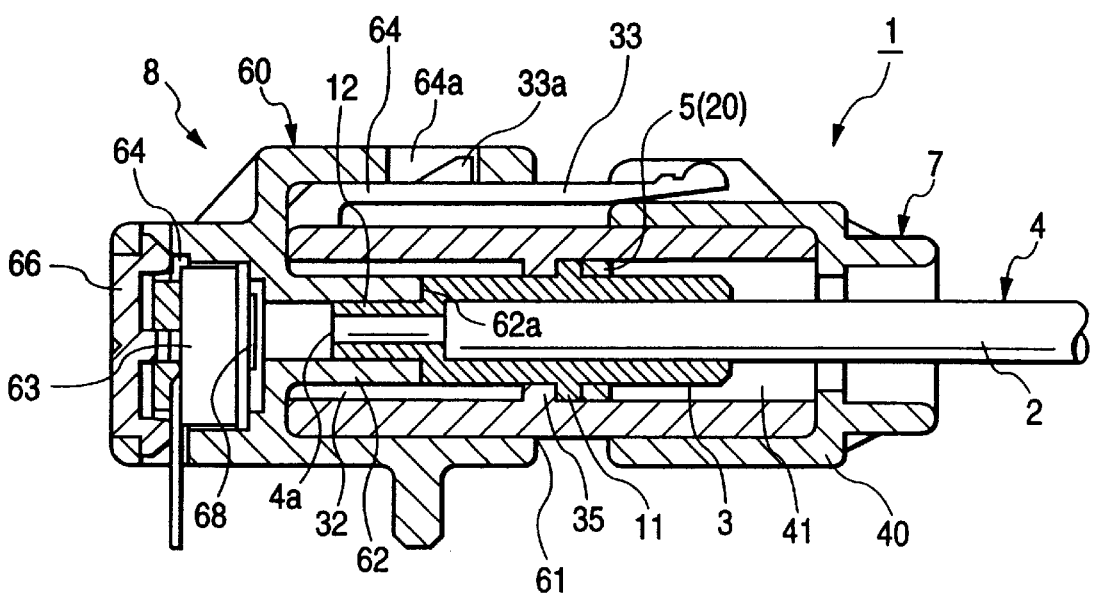
FIG. 11 is a cross-sectional view showing a condition in which the light receiving-emitting device is mounted on the connector of FIG. 9.

As shown in FIGS. 1, 10 and 11, the light receiving-emitting device 8 includes a box-shaped housing body 60, a connector receiving chamber 61 for receiving the optical fiber connector 1, receiving tubes 62 provided within the connector receiving chamber 61, and the light receiving-emitting elements 63 disposed in contact with front ends of the receiving tubes 62, respectively.

An arm chamber 64 for receiving the lock arm 33 of the connector housing 6 is formed at an upper wall 60a of the housing body 60 in an upwardly-bulging manner. The arm chamber 64 has an engagement hole 64a for receiving the lock projection 33a of the lock arm 33. A pair of element insertion holes 65 and 65 for respectively receiving the light receiving-emitting elements 63 are formed in a rear portion of the housing body 60. The light receiving-emitting elements 63, inserted respectively in the element insertion holes 65, are fixed within the housing body 60 by a retaining cap 66 attached to this housing body 60.

Mounting arms 67, through which the housing body 60 is mounted on a panel or the like (not shown), are formed on and extend from opposite side walls 60b and 60b of the housing body 60, respectively. Each of the mounting arms 67 has a screw hole 67a into which a screw or the like is threaded.

Each of the receiving tubes 62 is so sized as to receive the smaller tube 12 of the ferrule 3. A surface 63a of each of the light receiving-emitting elements 63 is disposed at the front end of the associated receiving tube 62 through an optical lens 68, and a distal end surface 4a of the associated optical fiber plug 4 is abutted against the rear end of the receiving tube 62. Namely, the optical fiber plug 4 is spring-biased (urged) against the rear end of the receiving tube 62 by the ferrule-pressing member 5. With this construction, the distance between the surface 63a of each of the light receiving-emitting elements 63 and the distal end surface 4a of the associated optical fiber plug 4 is kept constant. Therefore, the conversion of an electrical signal into an optical signal, as well as the conversion of an optical signal into an electrical signal, can be effected positively.

Next, a process of forming the optical fiber connector 1, using the ferrule-pressing member 5, will be described.

As shown in FIG. 2, the jacket 52 is peeled from the optical fiber 2 such that the clad 51 is exposed by a desired length. The clad 51 is inserted into the clad insertion hole 14 in the ferrule 3, and also the optical fiber 2 is inserted into the fiber insertion hole 13, and the optical fiber 2 is bonded to the inner surface of the ferrule 3. As a result, the optical fiber plug 4 is formed.

The distal end surface 4a of the optical fiber plug 4 is polished, and by doing so, the distal ends of the clad 51 and core 50, projecting from the clad insertion hole 14, are made flush with the end surface 12a of the ferrule 3. As a result, the distal end surface 4a of the optical fiber plug 4 can be kept spaced a predetermined distance from the light receiving-emitting element 63.

After the polishing operation, the optical fiber plugs 4 are fitted respectively into the insertion holes 41 in the holder 7 through the respective introduction notches 45, as shown in FIG. 6. After this inserting operation, the ferrules 3 of the optical fiber plugs 4 are fitted respectively into the retaining notches 22 in the ferrule-pressing member 5, and are slid until peripheral edges 23 of the retaining notches 22 are brought into contact with the front flange 11, as shown in FIG. 4. One coil spring 21 is fixedly secured to the ferrule-pressing member 5, and therefore at this time, the entanglement of coil springs with each other and the displacement of the coil spring 21 because of its own weight, as experienced in the conventional construction, will not occur. Therefore, the operation for mounting the coil spring 21 on the optical fiber plugs 4 is easy.

Alternatively, the optical fiber plugs 4 can be fitted respectively into the insertion holes 41 in the holder 7 through the respective introduction notches 45 after the ferrule-pressing member 5 is mounted on the two optical fiber plugs 4, as shown in FIG. 6.

The introduction notches 45, communicating respectively with the insertion holes 41 in the holder 7, are provided as described above, and therefore after the polishing operation, the optical fiber plugs 4 can be easily fitted into the holder 7. Therefore, as compared with the conventional construction, the step of fitting the coil spring 21 and the holder 7 on the optical fibers 2 is omitted. Therefore, the efficiency of the operation is markedly enhanced as compared with the conventional construction.

Figure 7:
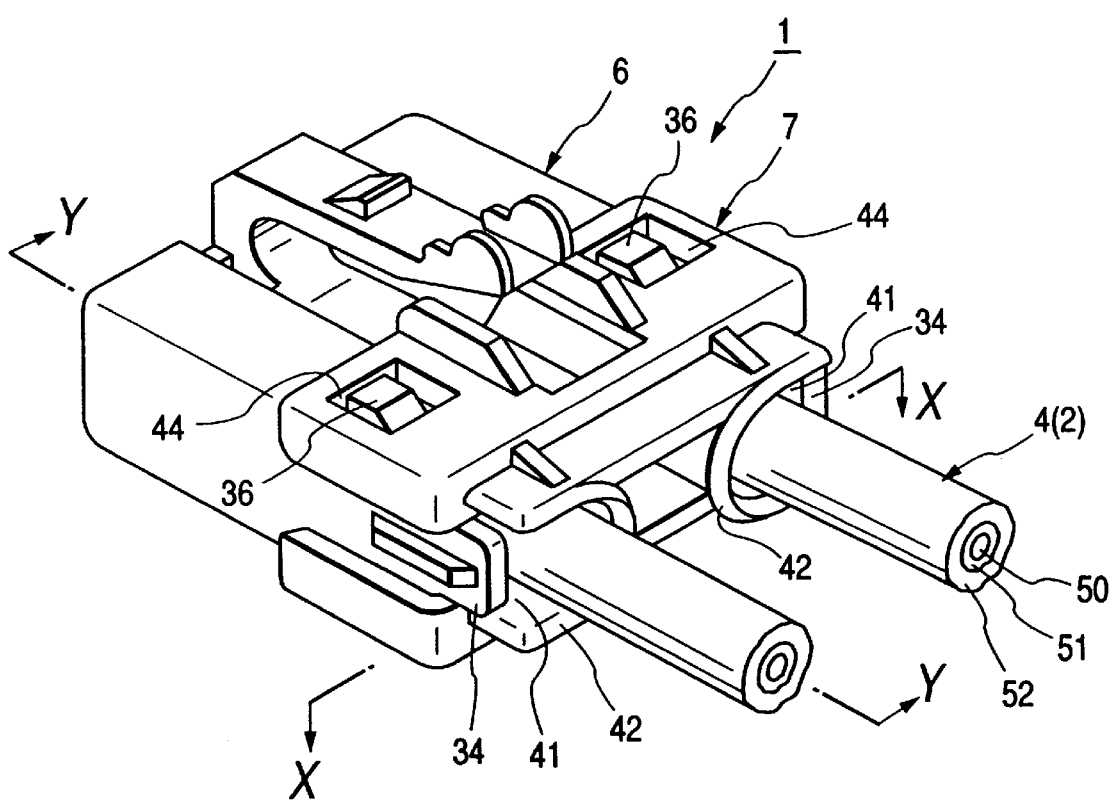
FIG. 7 is a perspective view showing a condition after the fitting operation in FIG. 6 is effected.

As shown in FIG. 6, the optical fiber plugs 4 are inserted into the ferrule receiving chamber 32 in the connector housing 6, with the smaller tubes 12 first introduced thereinto. In this condition, the front flanges 11 of the ferrules 3 are abutted against a flange 35 formed on the inner surface of the ferrule receiving chamber 32, as shown in FIGS. 8 and 9. The holder 7 is moved forward toward the connector housing 6 along the optical fibers 2. The holder 7 is pushed toward the opening 31 of the ferrule receiving chamber 32 against the bias of the coil spring 21, and is fitted on the connector housing 6, and is retained relative thereto by the engagement of the lock projections 36 in the respective lock holes 44. As a result, the optical fiber connector 1, shown in FIG. 7, is formed. In this condition, the ferrules 3 are spring-biased toward the connector housing 6, as shown in FIGS. 7 and 8. Also, the guides 34 of the connector housing 6 are received respectively in the insertion holes 41, and the optical fibers 2 are held by the insertion holes 41, the curved walls 42 and the guides 34.

As shown in FIGS. 1, 10 and 11, the light receiving-emitting elements 63 are inserted respectively into the element insertion holes 65, and the surface 63a of each of the light receiving-emitting elements 63 is opposed to the front end surface 62a of the associated receiving tube 62 through the optical lens 68. The retaining cap 66 is attached to the housing body 60, thereby holding the light receiving-emitting elements 63 in a fixed condition within the housing body 60. Then, for examples, screws are inserted respectively into the screw holes 67a in the light receiving-emitting device 8, and the light receiving-emitting device 8 is mounted on the panel (not shown) by these screws threaded into this panel.

The optical fiber connector 1 is inserted into the connector receiving chamber 61 in the light receiving-emitting device 8, so that the lock arm 33 is received in the lock chamber 64, and also the lock projection 33a is engaged in the engagement hole 64a. In this condition, the ferrules 3 of the optical fiber plugs 4 are abutted respectively against the rear ends of the receiving tubes 62 by the resilient force of the coil spring 21.

The two optical fiber plugs 4 are spring-biased by the single coil spring 21 as shown in FIG. 1, and therefore the number of the component parts is reduced as compared with the conventional construction. Therefore, the manufacturing cost of the optical fiber connector 1 can be reduced.

The ferrule-pressing member 5 is mounted on the ferrules 3 after the optical fiber plugs 4 are formed, and therefore the time and labor, required for fitting the coil springs 81 respectively on the optical fibers 82 of the conventional construction (FIG. 20), are omitted. Therefore, the coil spring 21 can be easily mounted on the optical fiber plugs 4, as shown in FIG. 1. And besides, an assembling error, such as the omission of the coil spring 21 and the mounting of more than one coil spring 21, is prevented.

As shown in FIG. 6, the peripheral edges 23 of the retaining notches 22 are abutted respectively against the front flanges 11 of the ferrules 3, and therefore the coil spring 21 is prevented from being inadvertently inserted deep into the ferrule receiving chamber 32 in contrast with the conventional construction. Therefore, the optical fiber connector 1 can be produced more easily and positively.

Figure 12:
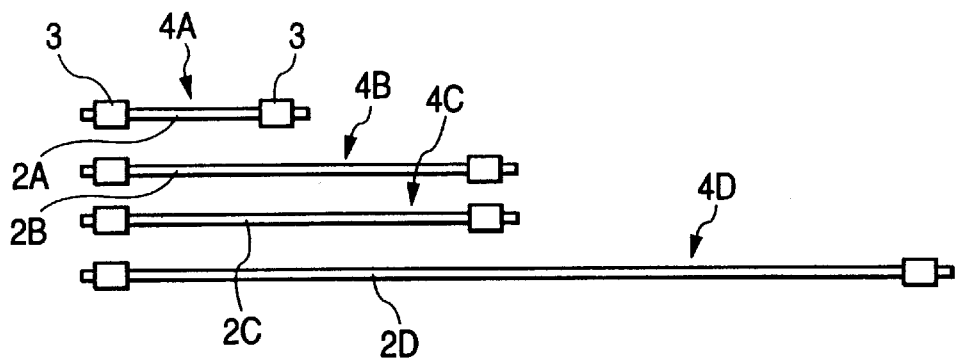
FIG. 12 is a view showing optical fiber plugs prepared for building a ring-like optical LAN.
Figure 13:
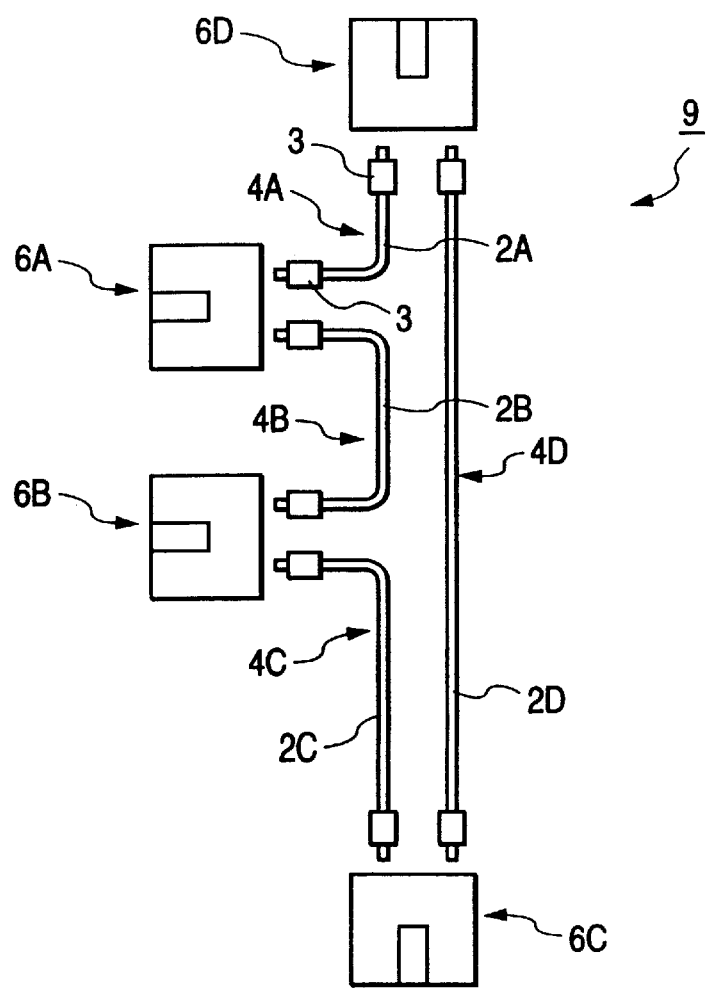
FIG. 13 is a view showing the ring-like optical LAN built by the optical fiber plugs of FIG. 12.

When a ring-like optical LAN 9 is to be built as shown in FIGS. 12 and 13, optical fibers 2A to 2D of desired lengths are prepared, and optical fiber plugs 4A to 4D are formed, and in contrast with the conventional construction, the optical fiber plugs 4A to 4D are arranged in a ring-like manner when mounting the optical fiber plugs 4A to 4D on connector housings 6A to 6D. Therefore, the polishing of the optical fiber plugs 4A to 4D is easier as compared with the conventional construction. Therefore, the operation for building the optical LAN 9 can be carried out easily.

Second Embodiment

FIGS. 14 to 17 show a second embodiment of an optical fiber connector of the invention. Those constituent members identical to those of the first embodiment will be designated by identical reference numerals, respectively, and detailed explanation thereof will be omitted.

Figure 14:
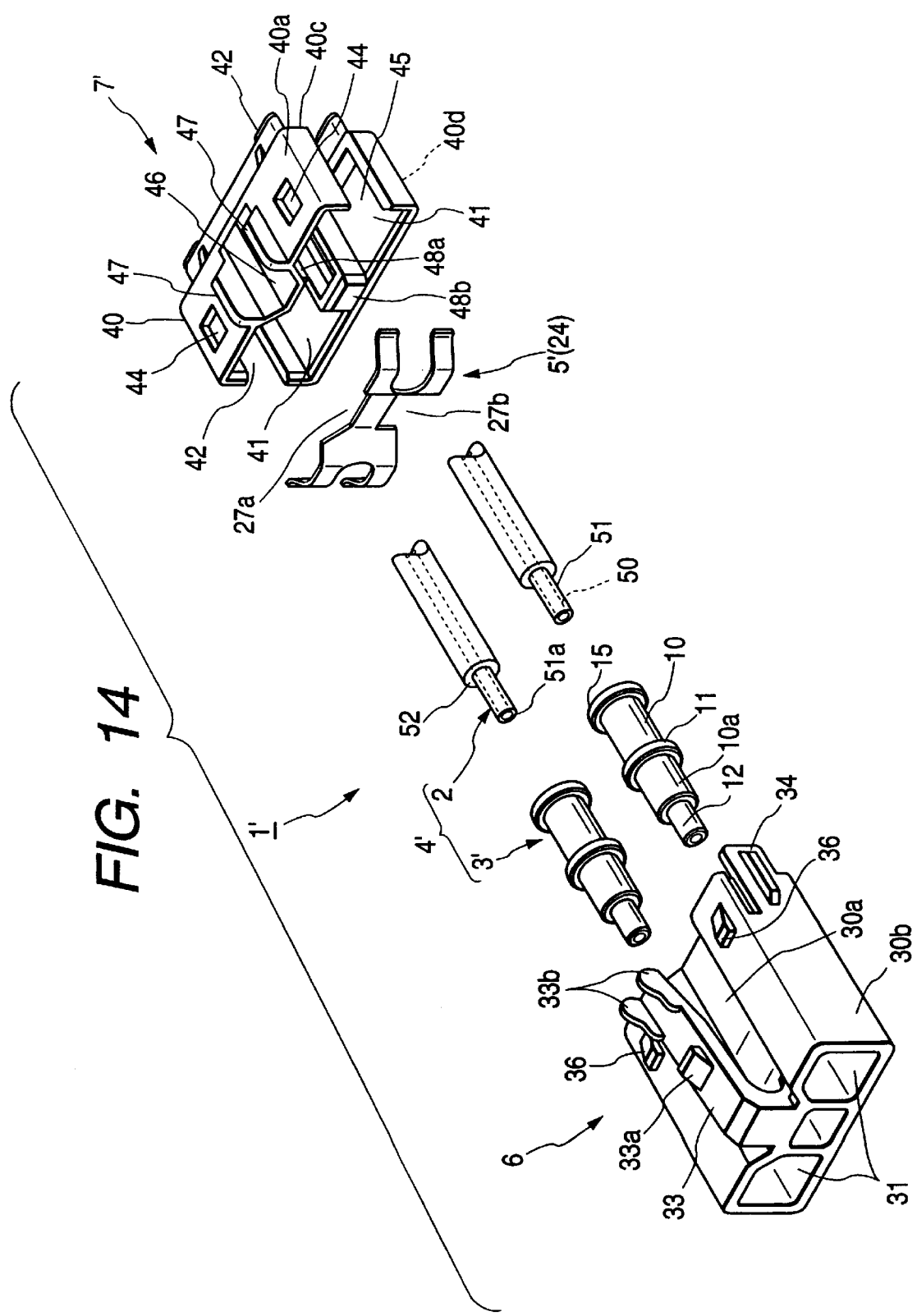
FIG. 14 is an exploded, perspective view of a second embodiment of an optical fiber connector of the invention.

As shown in FIG. 14, in this optical fiber connector 1', ferrules 3' are fitted on end portions of optical fibers 2, respectively, and optical fiber plugs 4' are inserted into a connector housing 6, and a ferrule-pressing member 5' is mounted on the optical fiber plugs 4', and a holder 7' is mounted on the connector housing 6.

The ferrule 3' includes a cylindrical body 10, having a front flange 11 and a rear flange 15 formed on an outer peripheral surface 10a thereof, and a smaller tube 12 extending from a front end of the cylindrical body 10.

Figure 15:
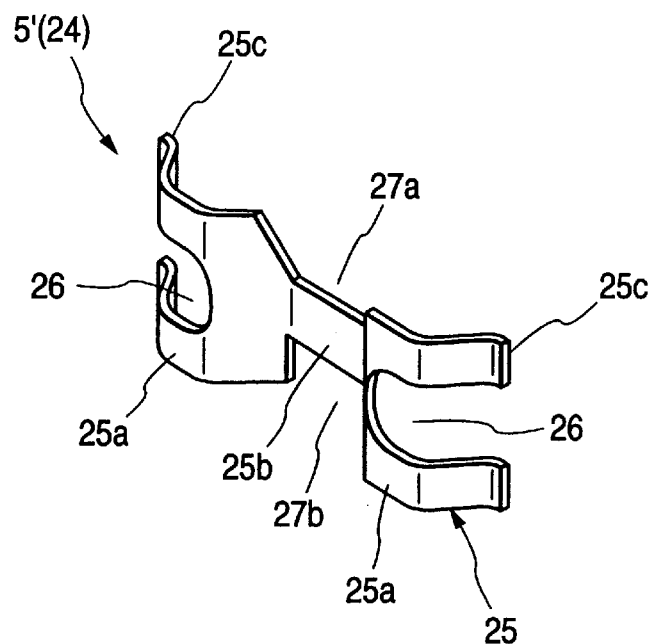
FIG. 15 is an enlarged, perspective view of a leaf spring member in FIG. 14.

As shown in FIGS. 14 and 15, the ferrule-pressing member 5' comprises a leaf spring member 24 supported within the holder 7'.

The leaf spring member 24 includes a leaf spring body 25 of a W-shaped cross-section (wavy cross-section), having concave portions 25a and a convex portion 25b, engagement notches 26, formed respectively in the concave portions 25a, an upper support notch 27a and a lower support notch 27b which are formed in the convex portion 25b.

The convex portion 25b is provided at a central portion of the leaf spring body 25, and each of the concave portions 25a is disposed between the central portion and a respective one of opposite ends of the body 25. The engagement notches 26 of a U-shape are formed respectively in the concave portions 25a, and extend respectively from the opposite ends of the leaf spring body 25 toward the central portion thereof. Each engagement notch 26 is so sized as to receive the optical fiber 2. The upper and lower support notches 27a and 27b are formed in the convex portion 25b, and are disposed intermediate the opposite ends of the leaf spring body 25. The upper support notch 27a is in the shape of a half of a hexagon, and the lower support notch 27b has a rectangular shape.

The leaf spring body 25 is formed into a W-shaped cross-section, and with this configuration, the resilient force of the leaf spring body 25 is enhanced. In the first embodiment of FIG. 1, the coil spring 21 is used in the ferrule-pressing member 5, and in the second embodiment of FIG. 14, the leaf spring 24 is used. The leaf spring 24 is less liable to be entangled with the optical fiber plug 4' and the optical fiber 2 than the coil spring 21 is, and therefore the leaf spring is advantageous from the viewpoint of the operation efficiency.

Figure 17:
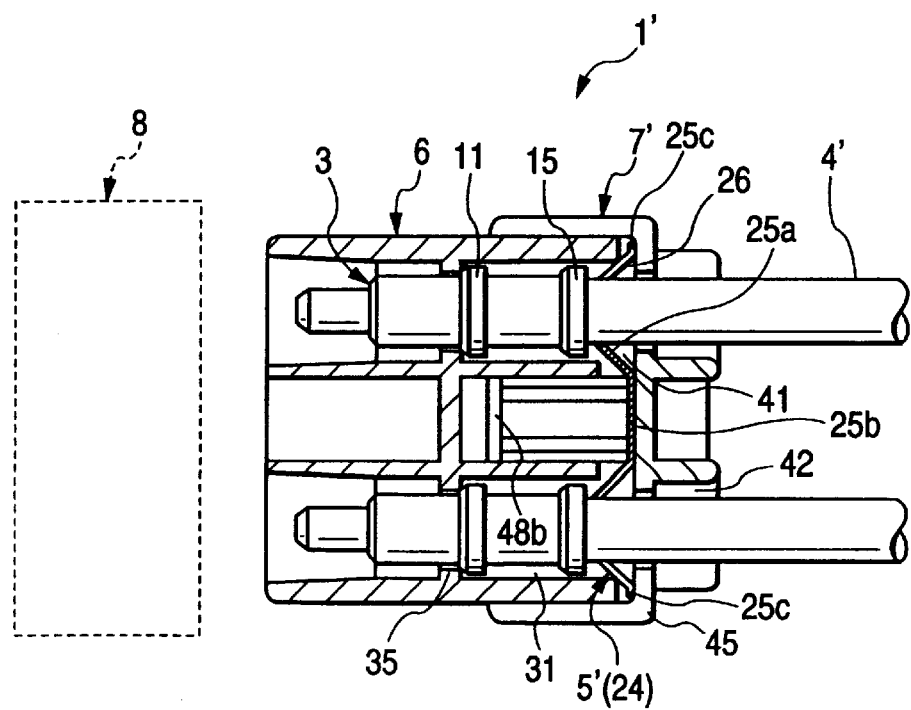
FIG. 17 is a cross-sectional view showing a condition in which the optical fiber connector of FIG. 16 is mounted on a light receiving-emitting device.

In the first embodiment, the two optical fiber plugs 4 are spring-biased by one coil spring 21 disposed therebetween, as shown in FIG. 8 and 17. On the other hand, in the second embodiment, although the two optical fiber plugs 4' are spring-biased by one leaf spring 24, halves of this leaf spring 24 are so disposed as to act on the two optical fiber plugs 4', respectively. Therefore, the optical fiber plugs are set to such a condition as obtained when using a resilient member for each optical fiber plug 4'. Therefore, from the viewpoint of spring-bias of the optical fiber plugs 4', the leaf spring 24 is more effective than the coil spring 21. In the second embodiment, the number of the component parts is smaller than the first embodiment, and the manufacturing cost of the optical fiber connector 1' can be reduced.

As shown in FIG. 14, the holder 7' includes a box-shaped holder body 40, a pair of insertion holes 41 formed through the holder body 40, and introduction notches 45, communicating respectively with the insertion holes 41. An upper guide rib 48a is formed on an inner surface of an upper wall 40a of the holder body 40, and a lower guide rib 48b is formed on an inner surface of a lower wall 40d of the holder body 40, and the upper and lower guide ribs 48a and 48b are disposed between the pair of insertion holes 41 and 41. The upper support notch 27a is guided by the upper guide rib 48a in parallel relation to the axes of the optical fibers 2, and the lower support notch 27b is guide by the lower guide rib 48b in parallel relation to the axes of the optical fibers 2, and the leaf spring is disposed within the holder body 40.

The connector housing 6 and a light receiving-emitting device 8, used in this embodiment, are identical in construction of those of the first embodiment, respectively.

Next, a method (process) of producing the optical fiber connector 1' will be described.

As shown in FIG. 14, the end portion of the optical fiber 2 is inserted into the ferrule 3', and is bonded and fixed thereto, thereby forming the optical fiber plug 4'.

Figure 16:
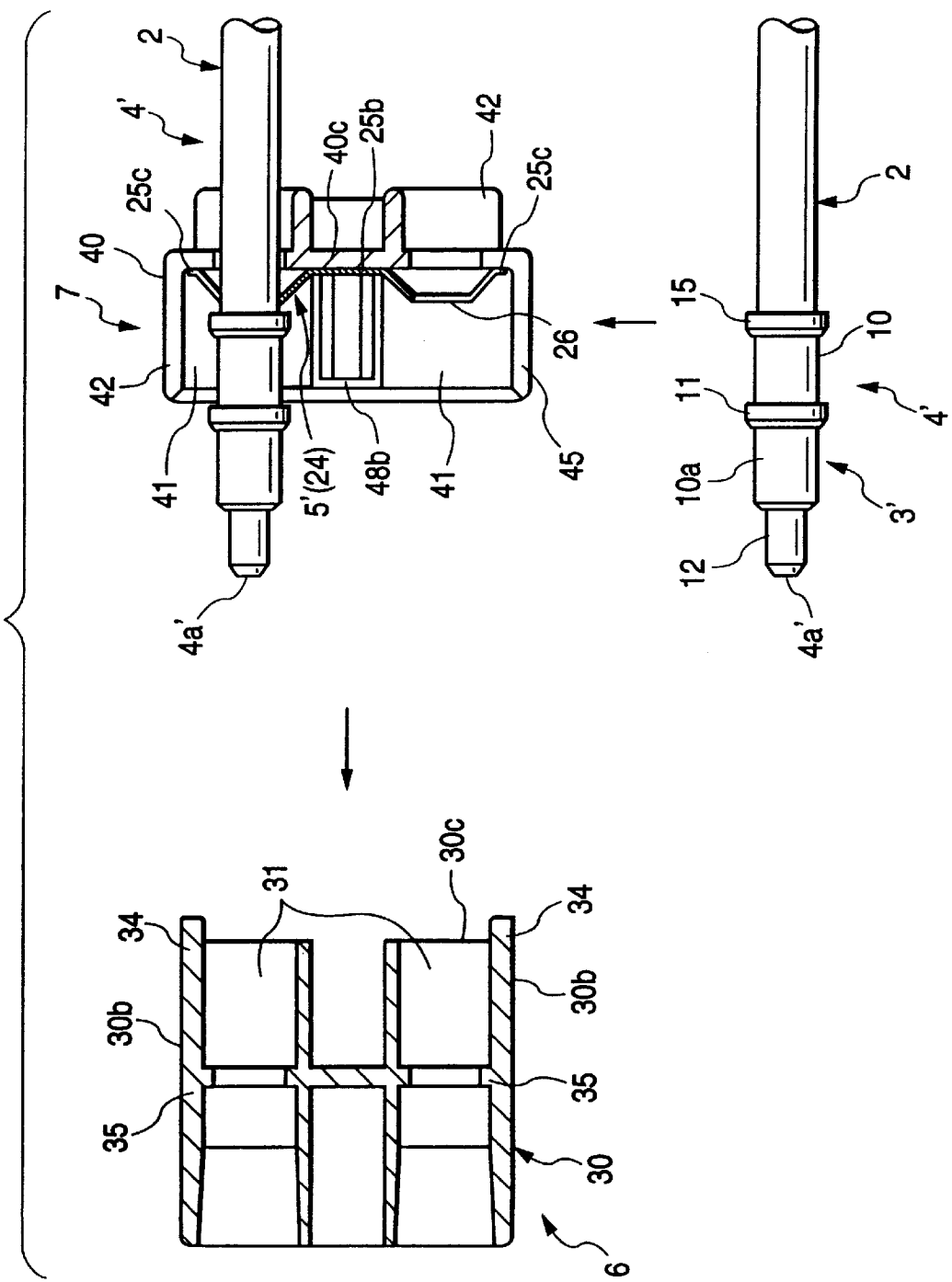
FIG. 16 is a cross-sectional view showing a condition in which an optical fiber plug is fitted into a holder, and is received in the leaf spring member.
Figure 18:
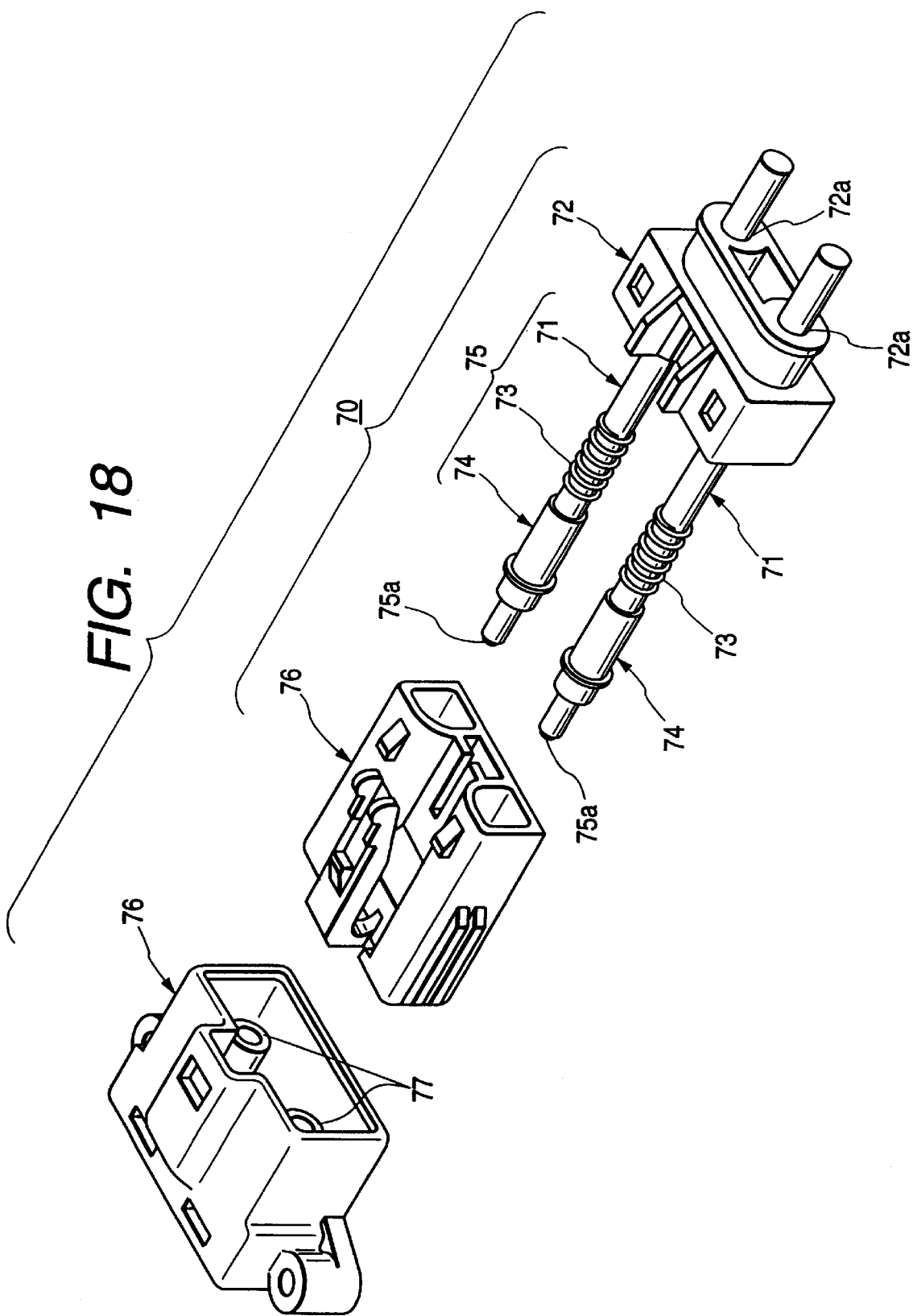
FIG. 18 is an exploded, perspective view of a conventional construction.
Figure 19:
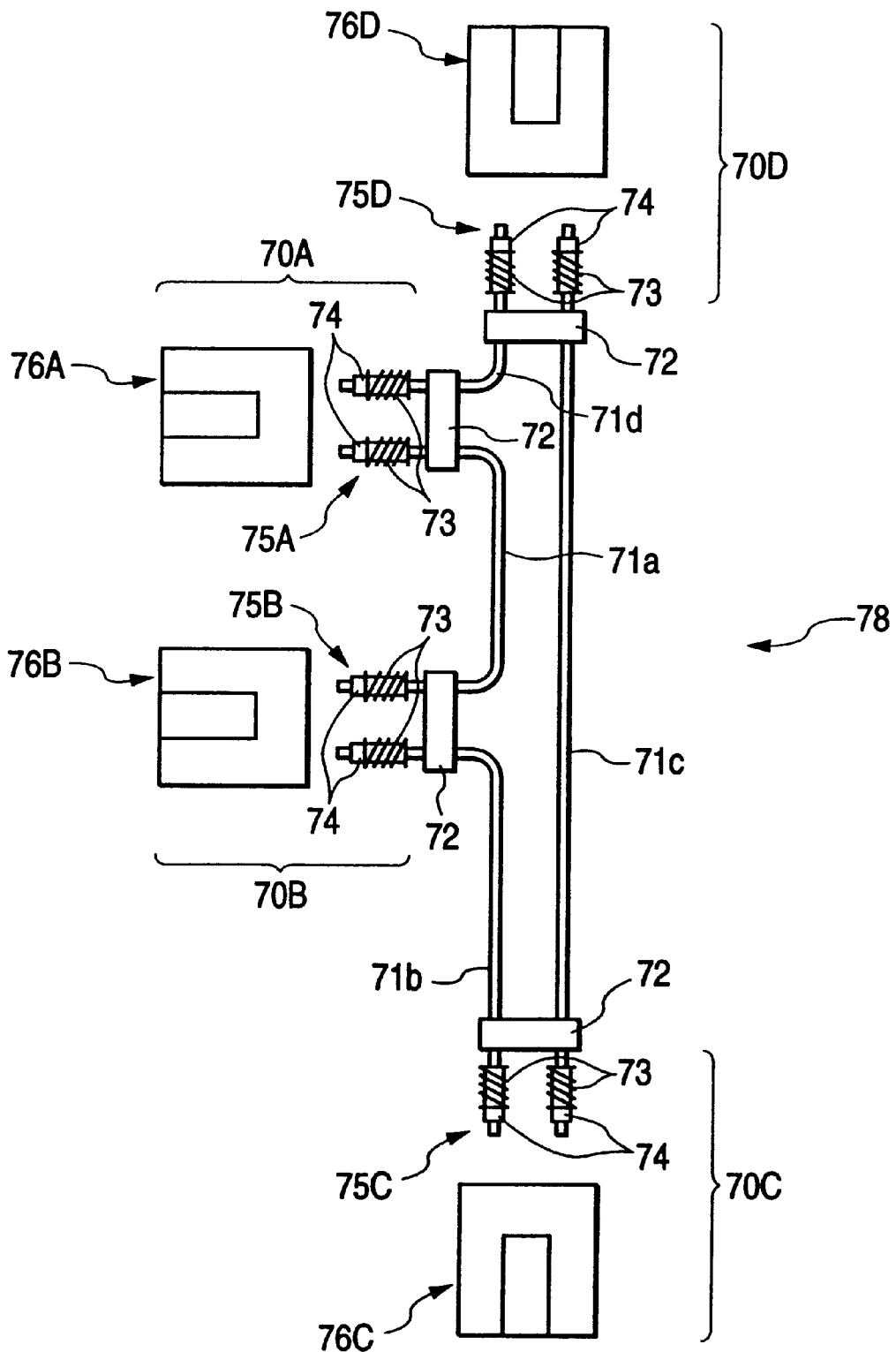
FIG. 19 is a view showing an optical LAN built by conventional optical fiber connectors.

As shown in FIGS. 14 and 16, the upper and lower support notches 27a and 27b in the leaf spring 24 are moved respectively along the upper and lower guide ribs 48a and 48b of the holder 7, so that the leaf spring 24 is inserted into the holder body 40.

After this insertion, the leaf spring 24 is supported in such a manner that the convex portion 25b and opposite ends 25c and 25c of the leaf spring 24 are held in contact with an inner surface of a rear wall 40c of the holder body 40.

Distal end surfaces 4a of the optical fiber plugs 4' are polished, and then the optical fiber plugs 4' are fitted respectively into the insertion holes 41 in the holder 71 through the respective introduction notches 45, and also the optical fiber plugs 4' are fitted respectively into the engagement notches 26 in the leaf spring 24.

As shown in FIG. 17, the front end portions of the optical fiber plugs 4' are inserted into a ferrule receiving chamber 32 in the connector housing 6, and the front flanges 11 of the optical fiber plugs 4' are abutted against a flange 35 within the ferrule receiving chamber 32. Also, the holder 7' is mounted on the connector housing 6 from the rear end portions of the optical fiber plugs 4'. As a result, the rear flanges 15 of the optical fiber plugs 4' are spring-biased forward through the concave portion 25b of the leaf spring 24. Thus, the optical fiber connector 1' is produced.

Then, the optical fiber connector 1' is fitted into the light receiving-emitting device 8 as described above for the first embodiment.

The ferrule-pressing members 5 and 5' of the above embodiments, shown in FIGS. 1 and 14, constitute one means for spring-biasing the ferrule 3 (3') toward the connector housing 6, and therefore they are not limited to the specific configurations of these embodiments.

As described above, in the present invention, the holder includes the insertion holes for respectively passing the optical fibers therethrough in the direction of insertion of the optical fiber plugs, and the introduction notches communicating respectively with the insertion holes in a direction intersecting the inserting direction. Therefore, the polished optical fiber plugs can be fitted respectively into the insertion holes through the respective introduction notches, and also the ferrule-pressing member can be mounted on the ferrules. Therefore, the polishing of the distal end surfaces of the optical fiber plugs can be effected more easily as compared with the conventional construction. Therefore, the production of the optical fiber connectors can be automated.

Since the polishing operation is easy, for example, the ring-like optical LAN can be easily built. More specifically, in the conventional construction, the optical fiber plugs must beforehand be formed into a ring-like pattern before the optical fiber plugs are inserted into the connector housing. In the present invention, however, by inserting the optical fiber plugs into the connector housing, the optical fiber plugs can be formed into a ring-like pattern.

In the present invention, the retaining notches, equal in number to the plurality of optical fiber plugs, are formed in a row in the pressing plate, and the coil spring, smaller in number than the optical fiber plugs, is fixedly secured to the pressing plate. Therefore, as compared with the conventional construction in which a coil spring is fitted on each of optical fiber plugs, only the force, required for fitting the holder on the connector housing, can be reduced while maintaining the force of spring bias of the optical fiber plugs toward the connector housing (that is, without reducing the spring bias force). Therefore, this fitting operation can be effected easily.

In the present invention, the coil spring of the ferrule-pressing member is disposed parallel to the direction of axes of the optical fiber plugs, and therefore the number of the coil spring can be reduced as compared with the conventional construction. Therefore, the number of the component parts can be reduced. Therefore, the manufacturing cost of the optical fiber connector is reduced.

The front peripheral flanges, formed respectively on the outer peripheral surfaces of the ferrules, are abutted respectively against the peripheral edges of the retaining notches, and the other end of the coil spring is retained by the spring retaining portion formed on the holder. Therefore, in contrast with the conventional construction, the coil spring is prevented from being inadvertently inserted deep into the connector housing when inserting the optical fiber plugs into the connector housing. And, the optical fiber plugs can be positively spring-biased toward the connector housing.

In the present invention, the leaf spring member, serving as the ferrule-pressing member, is supported within the holder.

The leaf spring member has the engagement notches for respectively passing the optical fibers therethrough. In this connection, each of the ferrules has the front flange for engagement with the connector housing, and the rear flange for engagement with the peripheral edge of the associated engagement notch, these flanges being formed on the outer peripheral surface of the ferrule. Therefore, the optical fiber plugs, when fitted respectively into the insertion holes, are received respectively in the engagement notches in the leaf spring. Therefore, the mounting of the ferrule-pressing member on the optical fiber plugs can be effected more easily.

The number of the component parts can be further reduced, and therefore the manufacturing cost of the optical fiber plug can be reduced.

In the present invention, the leaf spring is formed into a wavy cross-section, and has the concave portions and the convex portion, and the engagement notches are formed respectively in the concave portions. The concave portions abut against the rear flanges of the ferrules, respectively, and the convex portion is held against the inner surface of the holder. Therefore, the optical fiber plugs can be spring-biased toward the light receiving-emitting device.

The engagement notches are formed respectively in the concave portions, and therefore the engagement notches correspond to the optical fiber plugs, respectively. Therefore, for example, even when a plurality of optical fiber plugs are used, each of the optical fiber plugs can be positively spring-biased toward the light receiving-emitting device.

What is claimed is:

1. An optical fiber connector:
   a plurality of ferrules into which end portions of optical fibers are inserted respectively to form optical fiber plugs;
   a connector housing into which said optical fiber plugs are inserted;
   a holder fitted on said connector housing from rear end portions of said optical fiber plugs, said holder including insertion holes for respectively passing said optical fibers therethrough in a direction of insertion of said optical fiber plugs, and introduction notches communicating respectively with said insertion holes in a direction intersecting said inserting direction;

a light receiving-emitting device into which said optical fiber connector is fitted, distal end surfaces of said optical fiber plugs being kept spaced a predetermined distance respectively from light receiving-emitting elements received within said light receiving-emitting device; and a ferrule-pressing member for urging said optical fiber plug, fitted respectively into said insertion holes through the respective introduction notches, toward said connector housing, said ferrule-pressing member being mounted on said optical fiber plugs.

2. An optical fiber connector according to claim 1, in which said ferrule-pressing member includes a rectangular pressing plate, a coil spring fixedly secured at one end thereof to said pressing plate, and retaining notches formed in said pressing plate, and said ferrule-pressing member is mounted on said ferrules through said retaining notches.

3. An optical fiber connector according to claim 1 or claim 2, in which said coil spring is disposed parallel to a direction of axes of said optical fiber plugs, and front flanges, formed in a bulging manner respectively on outer peripheral surfaces of said ferrules, are abutted respectively against peripheral edges of said retaining notches, and a spring retaining portion for retaining the other end of said coil spring is formed on said holder, and all of said optical fiber plugs are simultaneously spring-biased toward said connector housing.

4. An optical fiber connector according to claim 1, in which said ferrule-pressing member includes a leaf spring member supported within said holder, and said leaf spring member has engagement notches for respectively passing said optical fibers therethrough, and each of said ferrules has a front flange for engagement with a portion within said connector housing, and a rear flange for engagement with a peripheral edge of said engagement notch, and said optical fiber plugs are passed respectively through said insertion holes, and are received respectively in said engagement notches.

5. An optical fiber connector according to claim 4, in which said leaf spring is formed into a wavy cross-section, and has concave portions and a convex portion, and said engagement notches are formed respectively in said concave portions, so that said concave portions abut against said rear flanges, respectively, and said convex portion is held against an inner surface of said holder, so that said leaf spring urges said optical fiber plugs toward said light receiving-emitting device.

* * * * *